3,290,382
HIGH VISCOSITY SULFUR CONTAINING
POLYFORMALS AND METHOD
Ralph A. Hubscher, Bruchfeldstrasse, Germany, and
Frank J. Milnes, Guilford, Conn., assignors to Olin
Mathieson Chemical Corporation, a corporation of
Virginia
No Drawing. Filed Dec. 13, 1963, Ser. No. 330,258
10 Claims. (Cl. 260—609)

This invention relates to high viscosity sulfur-containing polyformals and to a process for their preparation. More specifically, this invention relates to polyformal products prepared by reacting an aldehyde with a mixture comprising a thiopolyalkylene glycol and a polyalkylene glycol. The products of this invention are suitable for use as lubricants in central power system fluids as well as in other hydraulic fluids.

A central hydraulic system is analogous to the automotive electrical system in that it is capable of operating a multiplicity of devices from one central power system. A central hydraulic system consists of a pump, an accumulator, and a reservoir. Items which can be actuated from the central power system are brakes, steering gear, windshield wipers, window lifts, adjustable seats, convertible tops, starters, clutches, fuel pumps, injection equipment, air conditioning units, suspensions, and suspension leveling systems.

The most rigorous requirement of a central hydraulic fluid is viscosity, since the fluid must be equivalent to automatic transmission fluids at high temperatures, and yet must meet the low temperature requirements of a brake fluid. If it exhibits too low a viscosity, impaired power steering can result; the lack of lubricity is indicated by pump wear. The oxidation test comprises modulating or controlling the motor by dissipating excess energy as heat. Central system fluids must tolerate relatively high temperatures, viz., 100 to 150° F., above ambient temperature, to produce a practical heat dissipation potential without producing varnish, gum, sludge, or other products of deterioration that might impair the proper functioning of the system.

Heretofore, so single fluid has exhibited these compiled properties without a concomitant deposition of degradation products. It has unexpectedly been determined that high viscosity fluids are easily obtained when the sulfur-containing polyformals of this invention are utilized as the lubricant portion of such fluids. The sulfur atom in the molecule contributes materially to the lubricity and to the oxidation resistance of the polymer.

Another unexpected advantage lies in the great ease of preparation of useful polymers in the 1000 to 4000 centistoke (at 100° F.) kinematic viscosity range. For instance, in the reaction of a mixture of diethylene nd dipropylene glycols with formaldehyde, several hundred percent excess formaldehyde had to be used to reach 1000 cs., and the mechanical difficulties encountered make the reaction impractical. But, as shown in Example I, the reaction of mixed diethylene-thiodiethylene glycol with 30% excess formaldehyde proceeded readily to give a 2,555 cs. polymer.

Hydraulic fluids, in general, are comprised of at least three components: lubricants, solvents, and inhibitors. Adequate solvents and inhibitors are commercially available. This invention of a lubricant of greatly increased viscosity solves the heretofore unsolved problem of obtaining a universally applicable fluid for central systems.

In preparing the novel polyformals of this invention, an aldehyde, and a mixture composed of a thiopolyalkylene glycol and a polyalkylene glycol are heated together in the presence of a catalyst. Suitable catalysts include paratoluenesulfonic acid, boron trifluoride, sodium bisulfate, strongly acidic cation exchange resin, etc.

It has been found that paratoluenesulfonic acid is an especially valuable catalyst in that products with outstadning viscosity characteristics are formed when this acid is employed in the reaction. The catalyst comprises about 0.1% by weight of all reactants excluding solvents.

Sulfur-containing glycols useful in the practice of this invention include thioalkylene glycols of the formula:

$$H[OR]_xS[R'O]_yH$$

where $x$ and $y$ are whole numbers the sum of which is less than 5, R and R' are alkylene radicals, e.g., thiodiethylene glycol, thiotriethylene glycol, thiotetraethylene glycol, thiodipropylene glycol, and thiotriproplyene glycol. A mixture of thiopolyalkylene glycols can be used in this invention with enhanced results. Sulfur-free polyalkylene glycols and mixtures of sulfur-free polyalkylene glycols can be mixed with thiopolyalkylene glycols and mixtures of thiopolyalkylene glycols in the practice of this invention. Examples of suitable sulfur-free polyalkylene glycols include: diethylene glycol, triethylene glycol, tetraethylene glycol, etc. The preferred range of thiodialkylene glycol is 1.80 to 2.50 moles to 2 moles of dialkylene glycol.

Formaldehyde and paraformaldehyde are equivalent in the practice of this invention. Instead of paraformaldehyde, trioxane, methylal, aqueous formalin and similar formaldehyde-generating compounds may be used. Instead of formaldehyde, other reactive aldehydes, such as acetaldehyde, propanal, butanal, glyoxal, and other dialdehydes, containing not more than 8 carbon atoms in the monomeric form, and mixtures thereof, may be used. The operable range of the paraformaldehyde is 1.50 to 3.50 moles per 2 moles of glycol.

Although reactions at atmospheric pressure are convenient, pressures of reaction can be varied from subatmospheric to plus five atmospheres or more. The temperature for the reaction can range from approximately 80° C. to approximately 220° C. The preferred range is 80° C. to 190° C. The operable time of reaction ranges from 2 to 24 hours, preferably from 3 to 20 hours.

TABLE I.—FORMALS OBTAINED BY REACTING DIFFERENT POLYOL COMBINATIONS WITH PARAFORMALDEHYDE

| Moles Reactant | Moles Reactant | Moles CH₂O | Viscosity at 100° F. | Viscosity at 210° F. |
|---|---|---|---|---|
| 1 DEG | 1 hexylene glycol | 1.78 | 50.8 | 7.4 |
| 1 DEG | 1 1,3-butylene glycol | 1.78 | 48.5 | 7.3 |
| 1 DEG | 1 2,3-butylene glycol | 1.78 | 110.0 | 7.6 |
| 1 DEG | 1 propylene glycol | 1.78 | 48.0 | 7.5 |
| 1 DEG | 1 2,2-diethyl, 1,3-propanediol | 2.39 | | |
| 1 DEG | 1 neopentyl glycol | 2.39 | | |
| 1 EG | 1 propylene glycol | 2.00 | 53.0 | |
| 1 DEG | 1 trimethylene glycol (EK) | 1.78 | 37.1 | 5.9 |
| 1 DEG | 1 trimethylene glycol (dist. tech.) | 2.33 | 250 | 36.7 |
| 1 DEG | 1 1,4-butylene glycol | 2.39 | 1,433 | 190 |
| 1.6 DEG | 0.4 1,4-butylene glycol | 2.89 | 3,560 | 470 |
| 1 DEG | 1 1.5 pentanediol | 2.39 | 1,116 | 146 |
| 1 DEG | 1 dipropylene glycol | (¹) | 1,119 | |
| 1 DEG | 1 dibutylene glycol | 3.0 | 95.7 | |
| 1 DEG | 1 2-butyne 1,4-diol | 4.0 | 540 | |
| 1 DEG | 1 2-butene 1,4-diol | 4.0 | Under 600 | |
| 1 DEG | 1 glycerol | 5.0 | 83.5 | |
| 1 DEG | 1 sorbitol | 6.0 | 2,654 (ppt.) | |
| 6 Ethanol | ----do---- | 6.0 | (²) | |
| 1 DEG | 1 thiodiethylene glycol | 5.0 | 13,830 | 1,500 |
| 0.04 PPG 2025 | ----do---- | 20 | 32,400 | 2,570 |
| 1 PEG 400 | 1 PPG 425 | 4.0 | 784 | |
| 1 PEG 600 | 1 PPG 1,025 | 6.0 | 1,390 | |
| 1 PEG 6,000 | 1 PPG 2,025 | 40.0 | Paste | |
| 1 PEG 600 | 0.01 PPG 2,025 | 2.0 | 5,826 | |
| 1 PEG 600 | 1 PPG 2,025 | 20.0 | 7,460 | |
| 1 PEG 600 | 1 PPG 2,025 | 20.0 | 32,600 | 542 |

¹ Large excess.
² Very low (ethylal).

EG=ethylene glycol. DEG=diethylene glycol. PEG=polyethylene glycol. PPG=polypropylene glycol.

The following examples illustrate various embodiments of this invention and are to be considered not limitative.

*Example I*

A three-necked, 3000 ml. reactor equipped with a stirrer, Dean and Stark receiver, a reflux condenser, and a thermometer was charged with:

742 g. (7 moles) diethylene glycol
855 g. (7 moles) thiodiethylene glycol
500 g. 91% paraformaldehyde
500 g. benzene
2 g. paratoluenesulfonic acid The charge was refluxed and the water of reaction collected in a Dean and Stark receiver. The rate of water formation slowed down, indicating that most of the paraformaldehyde is reacted. An additional 100 g. of paraformaldehyde was added and the refluxing was continued. The reaction time was 12 hours. The charge was then cooled to 70° C. and was neutralized with 150 ml. of 10% lime slurry. The reaction mixture was heated to a temperature of 110° C. and solvent and water were distilled off. Upon cooling to 70° C., the charge was diluted with 500 ml. of benzene and filtered through a Büchner funnel under vacuum. The filtrate was stripped at a temperature of 120° C. at 75 mm. pressure yielding the sulfur-containing polyformal product. The kinematic viscosity of the polyformal product at 100° F. was 2,555 cs.; at 210° F., it was 286.2 cs. (ASTM slope, 0.36). The pour point —5° F.

*Example II*

To the apparatus utilized in Example I 1 mole of diethylene glycol, 1 mole of thiodiethylene glycol, 5.0 moles of paraformaldehyde, 500 g. of benzene, 2 g. of paratoluenesulfonic acid were added. The charge was refluxed and the water formed in the reaction collected in the Dean and Stark receiver. When the rate of formation had noticeably diminished, the charge was cooled to approximately 70° C. and neutralized with 150 ml. of 10% lime solution. Vacuum was applied and the charge was stripped at a temperature of 100° C. and a pressure of 75 mm. in order to remove water and un-reacted glycols. The kinematic viscosity of the polyformal product at 100° F. was 13,830 cs.; at 210° F. it was 1500 cs.

*Example III*

Using the apparatus of Example I a charge of 2 moles of thiodiethylene glycol, 2 moles of diethylene glycol, 5 moles of paraformaldehyde (164.9 g.), and 3 g. of paratoluenesulfonic acid were refluxed for a period of 10 hours. The reaction mixture was neutralized with 150 ml. of 10% lime solution. After being diluted with 500 ml. of benzene the charge was then filtered through a Büchner funnel under vacuum. The filtrate was stripped at a temperature of 100° C. and 75 mm. of pressure yielding the desired polyformal product in essentially quantitative yield. The polyformal product exihibited a kinematic viscosity at 100° F. of 27,800 cs.

*Example IV*

Using the apparatus of Example I, 1 mole of thiodiethylene glycol was mixed with 0.04 mole of polypropylene glycol (molecular weight, 2000) and 20 moles of paraformaldehyde. Paratoluenesulfonic acid catalyst was used. The charge was refluxed and the water reaction collected in a Dean and Stark receiver. When the rate of water formation had diminished, indicating that most of the paraformaldehyde had reacted, an additional 100 ml. of paraformaldehyde was added and the refluxing continued. The total reaction time was 8 hours. In the next step the charge was cooled to approximately 60° C. and neutralized with 150 ml. of 10% lime solution. The solvent and water were then distilled off by raising the temperature of the neutralized reaction mixture to approximately 110° C. A vacuum was applied and the charge was stripped at 120° C. at 75 mm. of pressure. Upon cooling to 70° C. the charge was diluted with 500 ml. of benzene. The filtrate was stripped of diluents by refluxing at 140° C. The thus-obtained polyformal product exhibited a kinematic viscosity of 32,400 cs. at 100° F. and 2570 cs. at 210° F. (ASTM slope, 0.31.)

What is claimed is:

1. A method of preparing a high viscosity sulfur-containing polyformal lubricant comprising reacting at a temperature of from about 80°C. to 220° C. a mixture of a thiopolyalkylene glycol of the formula:

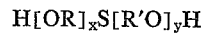

wherein $x$ and $y$ are whole numbers, the sum of which is less than 5 and R and R' are alkylene radicals having from 2 to 3 inclusive carbon atoms, and a polyalkylene glycol of the formula:

H[OR"]OH wherein R" is an alkylene radical having 2 to 3 inclusive carbon atoms and $n$ is an integer of from 2 to 35, with formaldehyde, from about 0.75 to about 1.75 moles of formaldehyde being reacted with each mole of glycol, there being in the said mixture from 1 to 25 moles of thiopolyalkylene glycol per mole of polyalkylene glycol and the reaction being conducted over a period of time ranging from 2 to 24 hours.

2. The method of claim 1 in which the thiopolyalkylene glycol is thiodiethylene glycol.

3. The method of claim 1 in which the polyalkylene glycol diethylene glycol.

4. The method of claim 1 in which the polyalkylene glycol is polypropylene glycol.

5. The method of claim 1 in which the mixture of the thiopolyalkylene glycol and the polyalkylene glycol are reacted with formaldehyde in the presence of paratoluenesulfonic acid.

6. The method of preparing a high viscosity sulfur-containing polyformal lubricant comprising reacting at a temperature of from about 80°C. to 220° C. a mixture of thiodiethylene glycol and diethylene glycol with formaldehyde in the presence of paratoluenesulfonic acid, from about 0.75 to about 1.75 moles of formaldehyde being reacted with each mole of glycol, there being in the said mixture from 1 to 25 moles of thiodiethylene glycol per mole of diethylene glycol, and the reaction being conducted a period of time ranging from 2 to 24 hours.

7. The method of preparing a high viscosity sulfur-containing polyformal lubricant comprising reacting at a temperature of from about 80°C. to 220° C. a mixture of thiodiethylene glycol and polypropylene glycol having a molecular weight of 2000, with formaldehyde in the presence of paratolulenesulfonic acid, from about 0.75 to about 1.75 moles of formaldehyde being reacted with each mole of glycol, there being in the said mixture from 1 to 25 moles of thiodeithylene glycol per mole of the said polypropylene glycol, and the said reaction being conducted over a period of time ranging from 2 to 24 hours.

8. A high viscosity sulfur-conaining polyformal lubricant prepared by reacting at a temperature of from 80° C. to about 220° C. a mixture of a thiopolyalkylene glycol of the formula:

H[OR]$_x$S[R'O]$_y$H wherein $x$ and $y$ are whole numbers, the sum of which is less than 5 and R and R' are alkylene radicals having from 2 to 3 inclusive carbon atoms, and a polyalkylene glycol of the formula:

H[OR"]OH wherein R" is an alkylene radical having 2 to 3 inclusive carbon atoms and $n$ is an integer of from 2 to 35 with formaldehyde, from about 0.75 to about 1.75 moles of formaldehyde being reacted with each mole of glycol, there being in the said mixture from 1 to 25 moles of thiopolyalkylene glycol per mole of polyalkylene glycol and the reaction being conducted over a period of time ranging from 2 to 24 hours..

9. A high viscosity sufur-containing polyformal lubricant prepared by reacting a mixture of thiodiethylene glycol and diethylene glycol with formaldehyde in the presence of paratoluenesulfonic acid, from about 0.75 to about 1.75 moles of formaldehyde being reacted with each mole of glycol, there being in the said mixture from 1 to 25 moles of thiodiethylene glycol per mole of the said polypropylene glycol, and the reaction being conducted over a period of time ranging from 2 to 24 hours.

10. A high viscosity sulfur-containing polyformal lubricant prepared by reacting at a temperature of from about 80° C. to about 220° C. a mixture of thiodiethylene glycol and polypropylene glycol having a molecular weight of 2000, with formaldehyde in the presence of paratoluenesulfonic acid, from about 0.75 to about 1.75 moles of formaldehyde being reacted with each mole of glycol, there being in the said mixture from 1 to 25 moles of thiodiethylene glycol per mole of the said polypropylene glycol, and the reaction being conducted over a period of time ranging from 2 to 24 hours.

No references cited.

CHARLES B. PARKER, *Primary Examiner.*

DELBERT R. PHILLIPS, *Assistant Examiner.*